D. Halladay,

Wind Wheel.

No. 4,064. Reissued July 5. 1870.

Witnesses
R. D. Smith
J. Lehmann

Daniel Halladay
By his atty
G. L. Chapin

N. PETERS, PHOTO-LITHOGRAPHER, WASHINGTON, D. C.

United States Patent Office.

THE UNITED STATES WIND-ENGINE AND PUMP COMPANY, OF BATAVIA, ILLINOIS, ASSIGNEE OF DANIEL HALLADAY.

*Letters Patent No.* 11,629, *dated August* 29, 1854; *extended seven years; reissue No.* 4,064, *dated July* 5, 1870.

IMPROVEMENT IN WINDMILLS.

The Schedule referred to in these Letters Patent and making part of the same.

*To all whom it may concern:*

Be it known that I, DANIEL HALLADAY, of Batavia, in the county of Kane and State of Illinois, have invented a new and useful Improvement in Windmills; and I do hereby declare that the following is a full, clear, and exact description of the same, reference being had to the annexed drawing making a part of this specification, in which—

Similar letters of reference indicate corresponding parts in the two figures.

The nature of my invention consists in having the wings or sails attached to movable or rotating spindles, having levers or equivalent devices connected to them, said levers or their equivalents being also connected to a head, which rotates with the wings or sails, and upon the same shaft, the head having a lever connected to it, which is operated by a governor, which slides the head upon the shaft, and causes the levers or their equivalents to turn the wings or sails, so as to present a proper resisting-surface to the wind, and thereby produce a uniform velocity of the wings or sails, which are made to have a greater or lesser obliquity, according to the velocity of the wind.

To enable others skilled in the art to fully understand and construct my invention, I will proceed to describe it.

Figure 1:
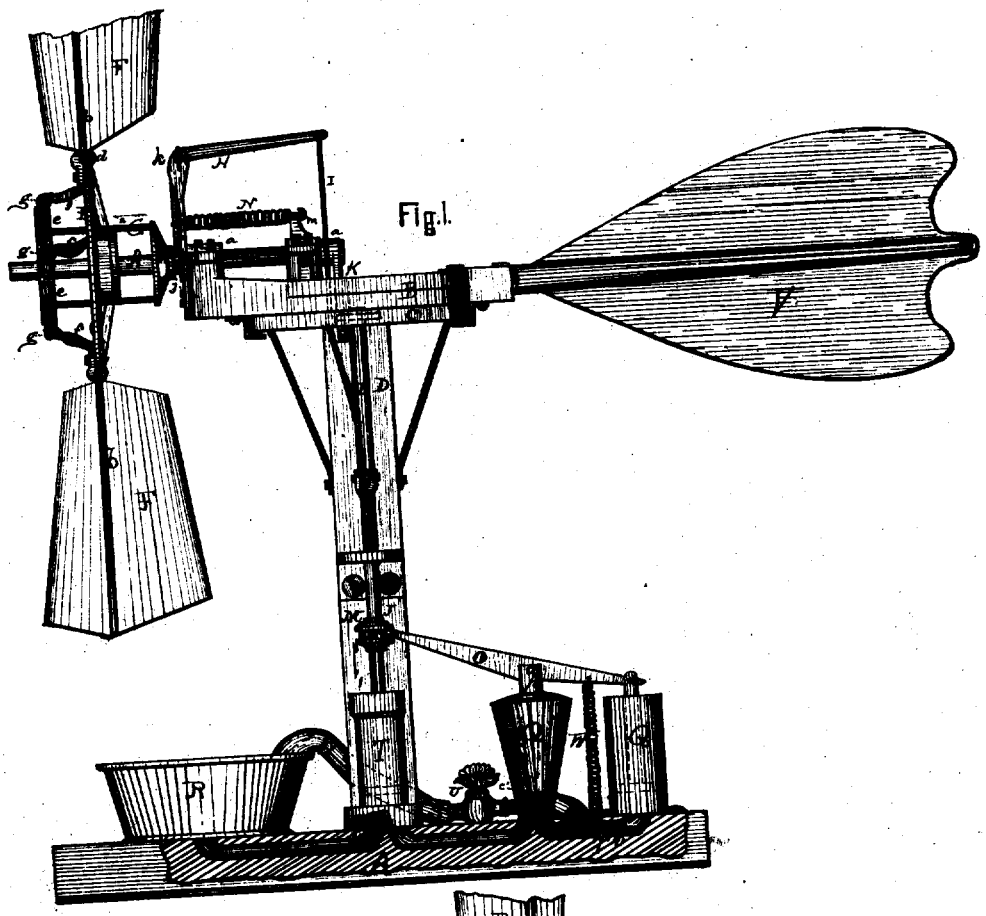
Figure 1 is a side elevation of my improved windmill, with the foundation broken away at A′, showing the water-pipes of the governor.

A represents a horizontal shaft, which works in suitable bearings, *a a*, upon a cap, B, said cap B working loosely upon a circular plate, C, attached permanently to a proper support or frame-work, D, (see fig. 1.)

The shaft A projects some distance beyond the edge of the cap B, as shown in fig. 1, and has a wheel, E, attached permanently to it.

F represents the wings or sails, which are secured to spindles *b*, said spindles passing radially through the rim of the wheel E, and into its hub, the spindles being prevented from withdrawing by collars *c*, which bear against the inner edge of the rim, and bearings *d*, (see fig. 2,) which are secured by screws over the spindles, the spindles being loose in the wheel E, and allowed to turn upon their axes. Four wings or sails are represented, but any proper number may be used.

Figure 2:
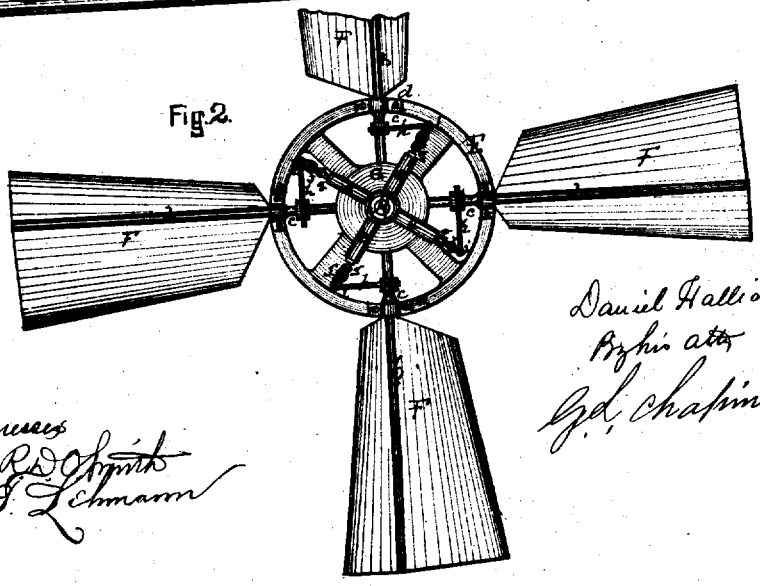
Figure 2 is a face view of the wings or sails, and the mechanism for turning them.

G is a head, fitted loosely upon the shaft A, and having projections, *e*, at its front end, to which projections small levers, *f*, are attached by pivots *g*, the outer ends of the small levers *h* being secured to the ends of connecting-rods *f* by pivots *i*. The levers *h* are secured permanently to the spindles *b*, as shown in fig. 2.

The inner end of the head G has a groove, *j*, turned on it, in which groove a forked lever, H, fits, (see fig. 1.)

The lever H is bent, and has its fulcrum at *k*; and to the outer end of the lever H a wire or rod, I, is attached, said wire or rod passing down in a groove, *l*, in a vertical rod, J, the upper end of which is connected to a crank, K, on the inner end of the shaft A by a connecting-rod, L.

The lower end of the wire or rod I is attached to a sliding head or boss, M, on the rod J.

N is a spring, one end of which is connected to the vertical portion of the bent lever H, and the opposite end to a projection, *m*, on the inner bearing *a* of the shaft A.

The sliding head or boss M, on the rod J, has a recess, *n*, in it, in which a fork at one end of a lever, O, fits, said lever O having its fulcrum at *p*.

The opposite end of the lever O is attached, by a pivot, to a piston-rod, P, the piston of which works within a cylinder, Q, (see dotted lines, fig. 1.)

R represents a reservoir containing water, and

T′ is a pipe, which communicates with the reservoir, and with a pump, T, a valve, *b*′, in the lower part of the pump being placed directly over the end of the said pipe T′, as shown in fig. 1.

T″ represents a pipe, communicating with the pump T′ and an air-chamber, Q′, that end of the said pipe T″ entering the chamber being provided with a valve, *c*′, as shown also in fig. 1.

T‴ is a pipe, which communicates with chamber Q′ and cylinder Q, and also with a pipe, S, the latter returning water to reservoir R.

U is a cock in the pipe S.

V is a horizontal vane attached to the cap B, for the purpose of keeping the wings or sails F facing the wind.

W is a spring attached to the lever O.

*Operation.*

The reservoir R is filled with water, and the wings or sails F, wheel E, and head G rotate with the shaft A, and the crank K, at the inner end of the shaft A, works the piston-rod J of the pump T, and the water in the reservoir R is, by means of the pipe T′, taken into pump T, from which, by means of a pipe, T″, it (the water) is forced into the air-chamber Q′, and from thence into cylinder Q, the water returning to the tank R through pipe S.

In case the shaft A revolves too rapidly, the cock U is somewhat turned, so as to check the free passage of the water through the pipe S; and the water will then be forced against the under side of the piston in the cylinder Q, and will raise it, and the head or boss M will, consequently, be moved down upon the rod J, (see arrow 1,) and the wire or rod I will draw downward the horizontal arm of the lever H, while the vertical arm will force outward the head G on the shaft A, (see arrow 2,) and the levers *h* and rod *f* will turn the spindles *b*, and the wings or sails F will move obliquely to the wind, and the motion of the mill will be decreased in a corresponding degree.

When it is desired to increase the motion of the mill, the cock U is opened, and, the water having a free passage through the pipe S, the head or boss M is raised upon the rod J, and the head G, on the shaft A, brought back to its original position by the spring N, the wings or sails presenting a greater surface to the wind.

The spring W causes the lever O to resume its original position, or depresses the piston in the cylinder Q, when the water has a free passage through the pipe S.

The windmill, as above described, is arranged for operating a pump, and the arrangement of the reservoir R and cylinder Q with the pipe-connections merely acts as a governor, it being understood that, in practice, the pump T draws the water from a well, instead of the reservoir, R, herein shown.

The above arrangement would be most economical where pumping alone is required; but in other cases, as in grinding grain, churning, thrashing, &c., a ball-governor would be operated by the rod J, or otherwise, which would then be connected to the shaft A by bevel-gearing, and have a rotary motion.

I do not confine myself to any particular form or kind of governor.

The above mill is more particularly designed for farmers' use, and in other cases where a moderate power is required. They are not expensive to manufacture, and may be moved from place to place with little difficulty, in order to perform the different sorts of work required to be done.

I do not claim attaching the wings or sails to spindles *b*, which turn on their axes irrespective of the arrangement for turning said spindles, in order to give them the desired obliquity, and thereby presenting a greater or lesser surface to the wind; but

I claim as new—

1. The combination of the connecting-rods *f* and levers *h* with the sliding head G and spindles *b* of the wings or sails, for the purpose set forth.

2. The combination of the sliding head G, arranged to regulate the obliquity of the wings or sails and the lever H, with a governor of proper construction, for the purpose of giving the desired obliquity to the wings or sails, as set forth.

3. A sliding head, G, connected to the spindles *b* (of the wings or sails) by means of the connecting-rods *f* and levers *h*, in combination with lever H and a governor of proper construction, for the purpose of giving the desired obliquity to the wings or sails, and thereby insuring an equal motion and power with a variable velocity of wind.

DANIEL HALLADAY.

Witnesses:
WM. M. VAN NORTWICK,
JAMES O. MCCLELLAN.